UNITED STATES PATENT OFFICE 2,437,352

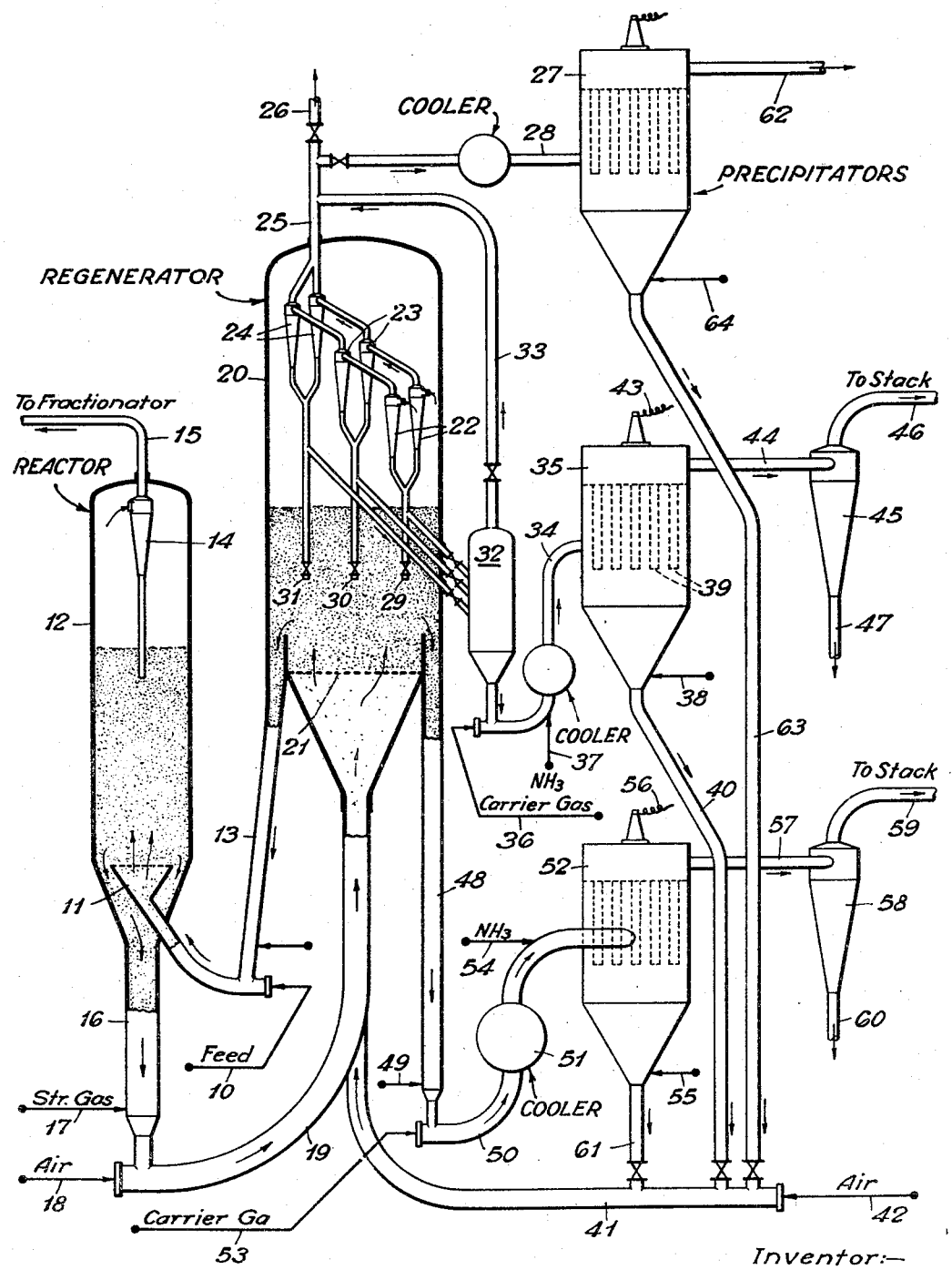

RECOVERY OF CATALYSTS

Nathan Fragen, Hammond, Ind., assignor to Standard Oil Company, Chicago, Ill., a corporation of Indiana Application December 29, 1945, Serial No. 638,416

6 Claims. (Cl. 196—52)

This invention relates to the conversion of hydrocarbons in the presence of contact catalysts and more particularly it relates to a process of converting hydrocarbons by contacting in the vapor phase with fluidized masses of metal oxide conversion catalysts where the catalyst is maintained in dense fluid suspension. In this process, carbon which is deposited on the catalyst during the conversion operation is removed by passing the catalyst in a fluidized stream to a regeneration zone where the carbonaceous deposits are burned off with oxygen and then the regenerated catalyst is returned to the hydrocarbon conversion zone.

The object of the invention is to provide a method and means for eliminating from such a suspension that part of the catalyst which is degenerated in conversion activity while retaining the remainder of the catalyst within the system. By effecting such elimination of degenerated catalyst, the efficiency of the operation, the thruput capacity, and the economy are increased. A more favorable product distribution is also obtained with elimination of the degenerated catalyst, i. e., less gas and carbon are formed and more gasoline results in cracking heavy oils such as gas oil.

The invention is illustrated by a drawing which shows diagrammatically an apparatus for carrying out the process. Referring to the drawing, a suitable hydrocarbon feed stock, in the liquid or vapor phase, is supplied by line 10 to distributor 11 in the base of reactor 12. The feed stock for this process is usually gas oil which is desired to be converted to gasoline. However, other stocks may be employed such as petroleum residuum, kerosene, and in case of reforming to increase knock rating, heavy naphtha may be charged. Where the feed is charged in the vapor phase, the vapors will usually be at a temperature of about 800 to 1000° F. Where the feed is in liquid phase or partly liquid phase, it is instantly vaporized by contact with hot regenerated catalyst from line 13 which may be at a temperature of 900 to 1200° F.

In reactor 12, the upflowing hydrocarbon vapors come in contact with a mass of fluidized conversion catalyst in dense suspension in the lower part of the reactor. The vapors flowing upwardly thru the reactor at a velocity of about 0.5 to 4 feet per second serve to maintain the catalyst in turbulent agitation. Catalysts employed in the reaction are usually siliceous but various metal oxides may be used such as oxides of aluminum, magnesium, zirconium, boron, chromium, molybdenum, and mixtures thereof, usually with silicon oxide. Various natural products may be employed as catalysts, particularly clays such as acid-treated montmorillonite clay known as Super Filtrol. The synthetic catalysts are usually prepared by precipitation of metal oxide or hydroxide from salt solutions or by gelation of a suitable metal oxide sol such as silica sol. Silica gel is frequently employed as a component of hydrocarbon cracking catalysts. The catalyst gel may be prepared in a massive form and subsequently granulated to the desired size or the gel may be initially prepared in the form of fine particles of suitable dimensions after drying. A microspherical gel catalyst such as silica gel promoted with aluminum or magnesium oxides having a particle size of 20 microns upwards to 200 or 300 microns is particularly suitable for this process. In general, the catalysts employed in fluidized solid contact processes of this kind have a particle size of from 2 to 200 microns diameter. A typical size analysis of a Super Filtrol in an operating cracking unit of 10,000 barrels daily capacity is a follows:

| Roller Method | Per cent | Screen Analysis | Per cent |
|---|---|---|---|
| 0–10 Microns | 0.4 | 40–80 Mesh | 1.0 |
| 10–20 Microns | 7.0 | 80–100 Mesh | 1.6 |
| 20–40 Microns | 20.5 | 100–150 Mesh | 9.4 |
| 40–80 Microns | 35.9 | 150–200 Mesh | 18.0 |
| 80 Microns and upwards | 36.2 | 200–250 Mesh | 17.5 |
| | | Finer than 250 | 53.3 |

The density of the catalyst suspension in the dense phase of reactor 12 is ordinarily about 15 to 25 pounds per cubic foot. In the upper part of the reactor above the dense phase level, a dilute catalyst phase exists in which the suspension of catalyst is of quite low density, generally well below one pound per cubic foot. The converted hydrocarbon vapors are discharged thru cyclone separator 14 which serves to knock back most of the catalyst carried off in the dilute phase with the vapors. The denuded vapors then pass by line 15 to a suitable fractionating system not shown where gasoline and other desired products are recovered. Catalyst carried off with these vapors is usually recovered as a slurry and may be returned to the system.

Deposition of carbonaceous material on the catalyst, generally to the extent of 0.1 to 5 per cent of its weight, requires that the catalyst be reactivated at frequent intervals. This is effected by withdrawing catalyst from the base of the reactor thru stripping tower 16 supplied with steam or inert stripping gas thru line 17, the purpose of the stripping being to remove volatilizable hydrocarbons as far as feasible and prevent their access to the regeneration stage. The catalyst stream is then picked up by a current of air or other suitable conveying gas introduced by line 18 and the resulting suspension flows thru duct 19 into the base of regenerator 20 wherein it is distributed by perforated grid plate 21. In regenerator 20, the catalyst is held in dense suspension, the density being similar to that maintained in reactor 12. In the presence of the oxidizing gases in regenerator 20, carbonaceous deposits are converted largely to $CO$, $CO_2$ and $H_2O$ which pass off with the regeneration gases. The reaction is highly exothermic and care must be taken to prevent overheating and damage to the catalyst. The temperature in the regenerator is usually held at about 1000 to 1200° F. by various methods of control such as by cooling and recycling a portion of the catalyst. Regeneration is usually not carried to the point of complete carbon removal, about 0.2 to 0.5 per cent of carbon being left on the catalyst.

As in the reactor, the upper part of the regenerator is occupied by a dilute phase suspension of the catalyst in the regeneration gases. This catalyst is largely recovered from the regenerator by suitable cyclone separators as indicated. Thus the gases may be required to flow thru three cyclones in series before leaving the regenerator. The drawing shows two such series arranged in parallel, the dilute catalyst suspension entering cyclones 22, thence thru cyclones 23 and finally thru the third stage cyclones 24, the gases finally passing out by line 25. These gases, freed of most all catalyst having a particle size above 20 microns diameter, may be discarded to the atmosphere by line 26 or further treated in an electrical precipitator 27 to which the gases are conducted by line 28.

The catalyst knocked back in cyclones 22, 23 and 24 may be returned to the dense catalyst phase in the lower part of the regenerator by dip legs 29, 30 and 31, respectively, or a part or all of the returned catalyst from any one or more banks of cyclones may be diverted into catalyst receiver 32 connected by pressure-equalizing line 33 to cyclone outlet 25. From receiver 32 the catalyst flows by transfer line 34 to electrical precipitator 35 where a separation is made between the catalyst of high activity and the catalyst of low activity. A current of steam, air, or other gas is introduced by line 36 as a carrier to convey the catalyst into the precipitator 35. A conditioner gas, particularly ammonia, may be added at 37 to assist in the electrical separation. Aeration gas, suitably air or steam, is introduced at the base of the precipitator by line 38. When ammonia is employed as a conditioner, the amount may suitably be about 1 to 5 pounds per 100,000 pounds of gas passing thru the precipitator.

In the precipitator 35, the catalyst is maintained in suspension in dilute phase in the upper part of the precipitator and in the precipitation tubes 39. The velocity of the gases flowing upwardly thru the tubes is just sufficient to maintain the catalyst in suspension and prevent its settling under the influence of gravity. This velocity is only slightly greater than that which may be calculated from Stokes' equation, viz:

$$u = \frac{KD^2\rho}{\mu}$$

$u$ = gas velocity; $D$ = diameter of solid particle; $\mu$ = gas viscosity; $\rho$ = density of solid particle; $K$ = constant.

For my purpose, it is satisfactory to employ a vapor velocity of about 10 to 30 per cent greater than that calculated, based on the size of the coarsest ten per cent of the catalyst charged to the precipitator. Best results are obtained by the treatment of catalyst having a narrow range of particle size. It is preferred to treat catalyst having a particle size range of about 30 to 80 microns diameter but good results are also obtainable with a somewhat larger range of particle size such as a catalyst in which at least 90% falls within the particle size range of 20 to 100 microns diameter. For catalyst particles greater than 20 microns diameter, a catalyst wherein 75% of the particles fall within about a 50 micron range is preferably treated in the electrical precipitator for the removal of degenerated material.

As the catalyst suspension passes thru precipitation tubes 39 where it is subjected to a high voltage electrical field resulting from the tension between the walls of the tubes and central electrodes, the active catalyst is flocculated and falls countercurrently to the gas stream into the base of the precipitation chamber 35 whence it is withdrawn by line 40 leading to catalyst recycle line 41, thru which the catalyst is driven by a current of air or other carrier gas introduced at line 42 back to the regenerator 20. High tension electricity for energizing the electrodes in precipitation tubes 39 is supplied thru lead 43. For this purpose a pulsating direct current of about 50,000 to 100,000 volts, with a pulsation frequency of 60 or 120 cycles per second, is suitable.

The catalyst which is rejected in precipitator 35 passes with the gases by line 44 to cyclone separator 45 where the degenerated catalyst is recovered and the gases are vented by line 46. Degenerated catalyst is withdrawn by line 47 and may be employed for other purposes such as decolorizing certain types of oils, as a filler in roadmaking material, etc. The reason for the selective action of the electrostatic field is not understood, but there is some indication that iron deposits on certain catalyst particles reduce their tendency to flocculate. The nature of the carbon deposit may also be a factor. The principal observed fact is that degenerated catalyst which gives a bad distribution of products is less readily flocculated.

The catalyst having the desired particle size range may be obtained for treatment in separator 35 by selecting the catalyst knocked back in the different cyclones 22, 23 and 24, the coarser catalyst being knocked back by cyclone separator 22 and the finer by cyclones 24. Thus, the catalyst recovered in cyclones 24 will usually consist largely of particles in the range of 20 to 60 microns diameter.

In addition to the treatment of catalyst knocked back from the dilute phase of the regenerator, I may also apply the electrical separation to catalyst withdrawn from the dense phase in the base of regenerator 20. Referring to the drawing, catalyst is removed from the regenerator by line 48, aerated by a suitable aeration gas injected at 49 and conducted by line 50 thru cooler 51 and thence into electrical precipitator 52, a suitable carrier gas being injected at 53. Conditioner gas, e. g. ammonia, may be introduced at 54. Carrier gas introduced at 53 may be steam, depending on the amount of humidity required for conditioning the catalyst to obtain optimum separation in electrical precipitator 52. Aeration gas introduced at 55 serves to fluidize the recovered catalyst and assist in maintaining the gas velocity thru the precipitation tubes within the critical range, for good separation. As described in the case of separator 35, the separator is energized thru electric connection 56. The discarded catalyst passes in suspension thru line 57 to cyclone separator 58 where the gases are discarded by line 59 and the separated degenerated catalyst by line 60. Active catalyst recovered in 52 is recycled by lines 61 and 41 to regenerator 20.

The drawing shows the current of gases and catalyst being introduced into precipitator 52 in a tangential direction, thus providing a centrifugal separating action within the precipitator and effecting separation of the coarser catalyst particles without bringing them into the electrical field within the precipitation tubes. As a result, more accurate control of precipitating conditions within the tubes is attainable. Other means may be employed for separating from the catalyst withdrawn by line 48 a fraction having a desired narrow particle size range, preferably within 40 microns' diameter. It is not necessary that the largest catalyst particle in the precipitator charge be no greater than 50 microns larger than the smallest catalyst particle but only that the main portion of the catalyst, i. e. about 75 per cent, lie within a 50 micron range of particle diameters. Some degree of separation of inactive catalyst can be obtained in precipitator 52 by treating the average catalyst directly as withdrawn by line 48.

Where the catalyst employed is substantially free of material having particle sizes below 20 microns, I have found it unnecessary to employ an electrical precipitator for treating the spent regeneration gas withdrawn by line 25 since the cyclone separators recover most of the catalyst coarser than 20 microns' diameter. In case of natural catalysts such as Super Filtrol, however, and in case of certain synthetic catalysts lacking sufficient physical strength to prevent mechanical breakdown to particles having dimensions below 20 microns' diameter, it may be desirable to employ an electrical precipitator to recover such catalyst. Precipitator 27 is shown for this purpose. The off gases, substantially free of catalyst, are discharged by line 62 and the recovered catalyst is conducted by line 63 to recycle line 41 as hereinabove described. Aeration gas can be introduced at line 64.

Having thus described my invention what I claim is:

1. The process of separating degenerated catalyst from a fluidized solid catalyst hydrocarbon conversion system in which a finely divided catalyst is regenerated by oxidation of carbonaceous deposits in a regeneration zone containing a dense fluidized suspension of catalyst in the lower part thereof and a dilute catalyst phase in the upper part, the improvement which comprises recovering catalyst from regeneration gases in said dilute phase by centrifugal action, redispersing said recovered catalyst in dilute suspension in a gas and passing said dilute suspension through an electrostatic field at a velocity sufficient to carry particles of degenerated catalyst thru said field while retaining the particles of active catalyst and recovering said retained active catalyst for further use.

2. The process of claim 1 wherein the dilute phase catalyst suspension in said regenerator is conducted thru a series of centrifugal stages and the recovered catalyst from one of said stages is alone subjected to the action of said electrostatic field.

3. In the process of converting hydrocarbons by the action of fluidized, finely divided, solid catalyst, wherein said catalyst is periodically subjected to oxidation to remove carbonaceous deposits and regenerate it for further use, said oxidation being effected by forcing an oxygen-containing gas upwardly thru a mass of said catalyst in dense phase suspension in a regeneration zone, the method of separating permanently degenerated catalyst particles from said catalyst mass which comprises withdrawing catalyst from said dense phase suspension, cooling it to about 350 to 650° F., injecting additional gas into said dense phase catalyst stream sufficient to produce a dilute phase suspension, passing said dilute phase suspension thru an electrostatic field and controlling the velocity of said suspension within said field and the intensity of said field to effect flocculation and recovery of active catalyst particles in said suspension while rejecting degenerated catalyst particles which pass through said field, and thereafter recycling said recovered active catalyst particles to the conversion operation.

4. The process of claim 3 wherein said catalyst withdrawn from the dense phase suspension in said regeneration zone is classified to provide a fraction having a selected narrow range of particle size and said fraction is subjected to separation in said electrostatic field.

5. The process of claim 3 wherein said catalyst withdrawn from the dense phase suspension in said regeneration zone is classified to provide a fraction at least 75 per cent of the particles of which have a diameter falling within the range of 20 to 100 microns.

6. The process of separating degenerated catalyst from a fluidized solid catalyst hydrocarbon conversion system in which a finely divided catalyst is regenerated by oxidation of carbonaceous deposits by contacting a suspension of said catalyst with an oxygen-containing gas in a regeneration zone, the improvement which comprises recovering from regeneration gases substantially all catalyst having particle sizes above about 20 microns' diameter while discarding with said gases catalyst having particle sizes less than about 20 microns' diameter, redispersing said recovered catalyst in dilute suspension in a gas and passing said dilute suspension thru an electrostatic field at a velocity sufficient to carry particles of degenerated catalyst thru said field while retaining the particles of active catalyst and recovering said retained active catalyst for further use.

NATHAN FRAGEN.

REFERENCES CITED

The following references are of record in the file of this patent:

UNITED STATES PATENTS

| Number | Name | Date |
| --- | --- | --- |
| 1,357,466 | Moller | Nov. 2, 1920 |
| 2,304,128 | Thomas | Dec. 8, 1942 |

OTHER REFERENCES

"Improved Fluid Process for Catalytic Cracking," by E. V. Murphree et al., National Petroleum News, March 7, 1945; pages R 194, 195, 198, 199, 202 and 204.